May 5, 1970  H. L. FITCH ET AL  3,509,820
SEISMIC CHARGE ASSEMBLY, SEISMIC CHARGE PRIMER, AND
METHOD AND SYSTEM EXPLORATION
Filed April 21, 1969  3 Sheets-Sheet 1

HOMER L. FITCH
JOHN F. HAMILTON
*INVENTORS*

BY S. Frank Stewart
ATTORNEY

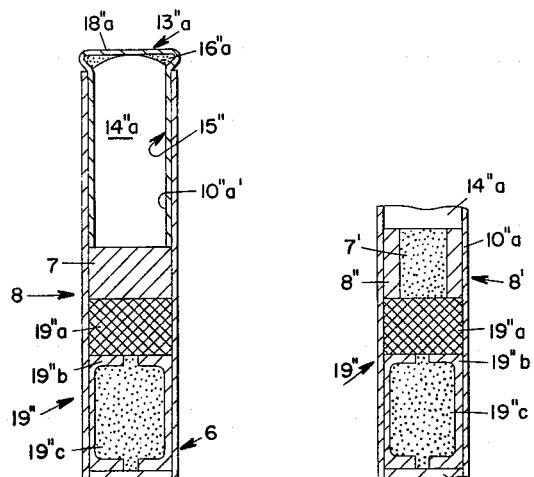
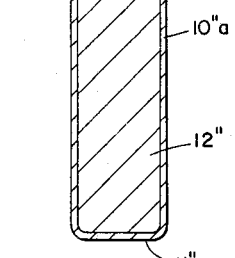
FIG. 3
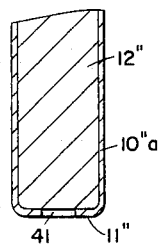
FIG. 3B
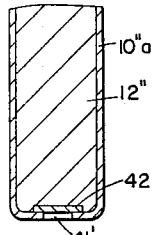
FIG. 3C
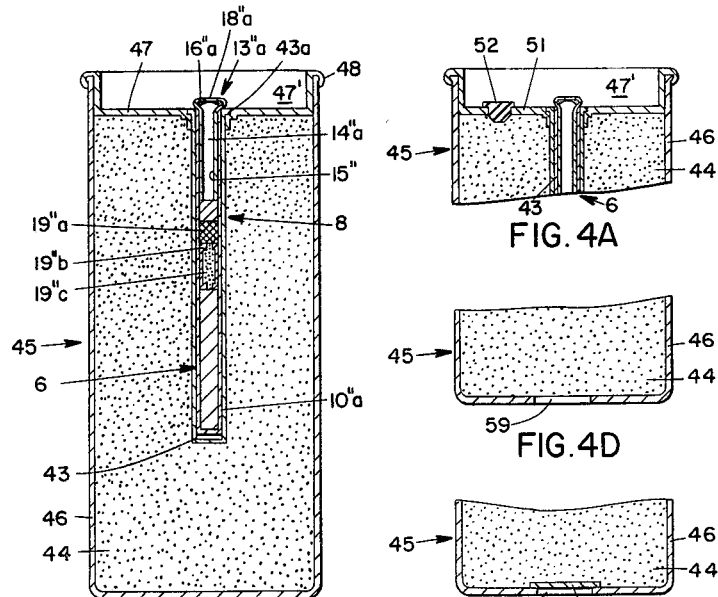
FIG. 4
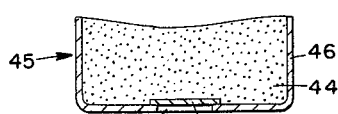
HOMER L. FITCH
JOHN F. HAMILTON
*INVENTORS*
BY S. Grant Stewart
ATTORNEY

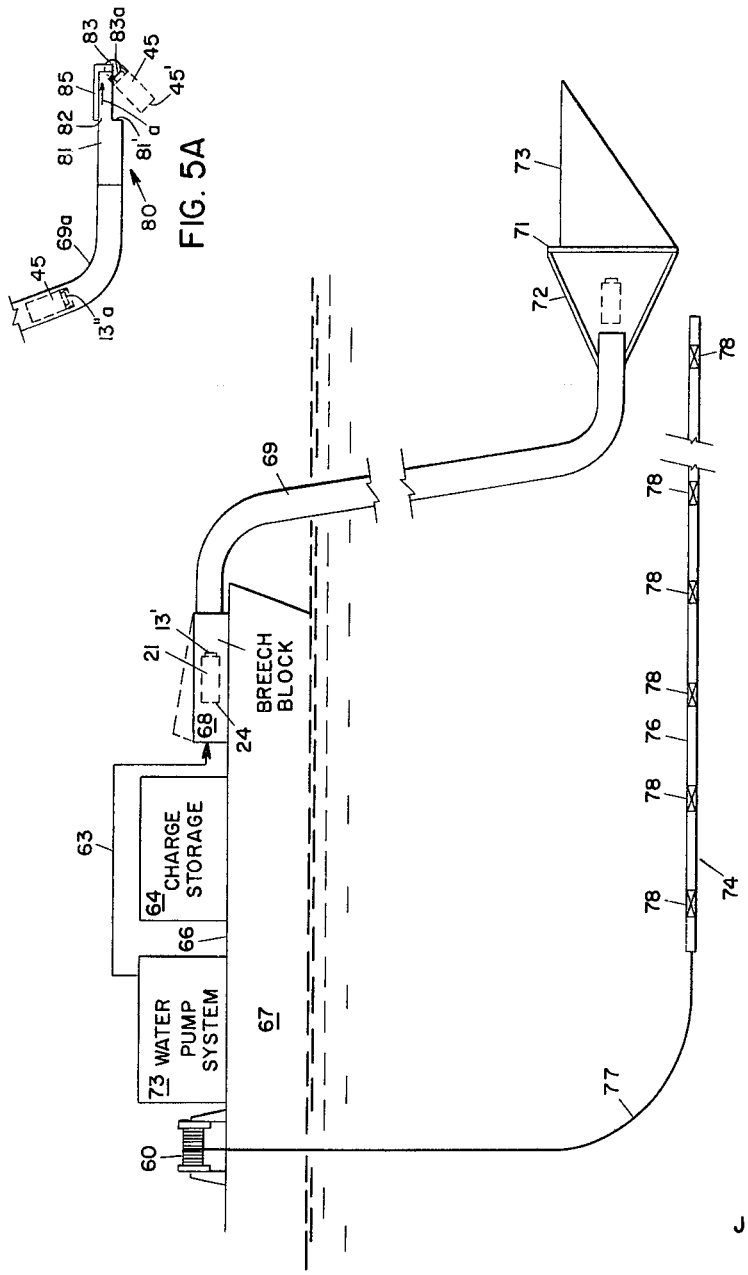

United States Patent Office 3,509,820
Patented May 5, 1970

3,509,820
SEISMIC CHARGE ASSEMBLY, SEISMIC
CHARGE PRIMER, AND METHOD AND
SYSTEM EXPLORATION
Homer L. Fitch, Mount Arlington, N.J., and John F. Hamilton, Wilmington, Del., assignors to Hercules Incorporated, Wilmington, Del., a corporation of Delaware
Continuation-in-part of application Ser. No. 673,594, Oct. 9, 1967. This application Apr. 21, 1969, Ser. No. 818,476
Int. Cl. F42b 3/10; F42c 1/00
U.S. Cl. 102—24                        28 Claims

ABSTRACT OF THE DISCLOSURE

The invention provides:

Figure 1:
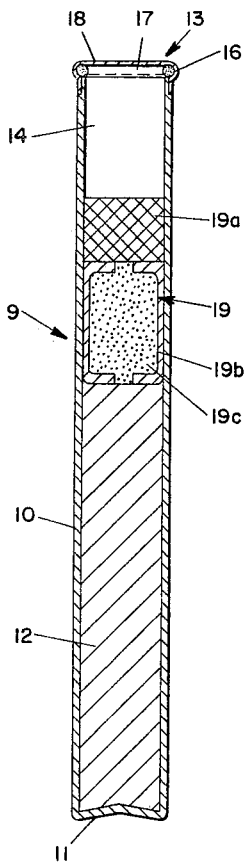

(1) A complete explosive charge assembly for offshore seismic exploration comprising a closed cartridge shell, and a small seismic explosive charge therein; and a percussion initiatable primer device for said charge extending into the detonating relationship therewith. The assembly is provided optionally with means for delay of the priming action for delayed detonation outside the firing system. The embodiment, with delay means, is now preferred.

(2) A percussion initiatable primer device for the preferred embodiment of charge assembly comprising a combination of high explosive base charge, primer charge, delay fuse type composition and a percussion sensitive initiator means, generally an empty primed rifle cartridge casing, often for 0.22 caliber short ammunition.

(3) A seismic exploration method including the steps of delivering an above described delayed seismic charge assembly into an underwater seismic zone, and then impacting the assembly to percussion initiate it; and during the period of delay, directing the thus initiated assembly away from its point of initiation.

(4) A system for generating seismic disturbances under water utilizing a complete charge assembly above described, and including a movable platform, and associated means for loading and delivering the assemblies from the platform to an underwater seismic zone and there impacting same for the initiation, and detonation, to provide seismic energy.

---

This application is a continuation-in-part of our copending application Ser. No. 673,594, filed Oct. 9, 1967.

This invention relates to a complete explosive charge assembly containing a percussion initiatable primer element and having particular applicability as an energy source in underwater seismic exploration. In one aspect this invention relates to a complete explosive charge assembly, above described, containing a small nitrocarbonitrate main charge, which can be fired in large numbers in an offshore seismic exploration area without the attendant disadvantages heretofore in the handling of such charges, and which provide an excellent seismic record without high fish kill. In another aspect this invention relates to a complete explosive charge assembly, above described, containing self-desensitizing and/or self-disarming means for the primer element and/or the main charge after an underwater misfire. In another aspect this invention relates to a percussion initiatable primer device containing means for delay of its priming action, and particularly applicable to underwater seismic exploration to permit further handling of the initiated charge assembly prior to detonation of same. In still another aspect this invention relates to a complete explosive charge assembly containing a primer element with delay means, above described. In yet another aspect this invention relates to an underwater seismic exploration method, in accordance with which an explosive charge assembly, as the energy source, is emplaced for initiation with delay of the subsequent detonation until there has been time for the initiated charge to travel from the firing system to thereby eliminate the possibility of damage to the system by force of resulting detonation. In yet another aspect this invention relates to a seismic exploration system involving use of percussion initiatable seismic charge assemblies, above described, as the seismic energy source.

Seismic exploration involves the introduction of energy into the earth to initiate wave action for determination of characteristics of subsurface structures, and is based on the generation of sound, or seismic, waves which are reflected or refracted from buried strata interfaces, and the like.

It has been general practice to detonate high explosives as the energy source for seismic exploration inasmuch as the energy generated provides for excellent seismic records. The use, for exampe, of a 60 percent gelatin dynamite provides a sharp shock wave with an abrupt front of great pressure intensity which is desirable from a seismic point of view. Unfortunately, in offshore exploration, shock energy from detonation of high explosives is often unduly damaging to certain marine life including many of the important food and game species. Accordingly, some authorities refuse permits for seismic operations in those areas where high velocity explosives might be employed, and hence those explosives no longer find use in such areas. Also, most dock facilities associated with transport of high explosives to offshore seismic exploration areas are limited in the quantity of high explosives that can be on the dock at any one time, to minimize the safety hazards involved. This in turn limits the amount of high explosives that can be handled on the dock and impairs the efficiency at which the explosives can be loaded across the dock and transported to the exploration site.

The use of nitrocarbonitrate (NCN) explosive charges in offshore seismic areas has met with success. However, in some instances the use of large NCN seismic charges has resulted in unduly high fish kill. The use of small nitrocarbonitrate charges in offshore seismic practice to minimize fish kill has of course required emplacement and detonation of a proportionately larger number of charges in a given test area, which in turn requires emplacement and shooting of charges more rapidly than was necessary in accordance with earlier practice. Further, the rate at which it has been possible to emplace small nitrocarbonitrate charges from a moving boat, and then detonate them, has been impaired by the unwieldy handling of the various communication lines from the boat to the charge.

In numerous instances, underwater mechanical devices have been used to more rapidly assemble and position the seismic charges to thereby reduce charge size and overcome the above disadvantages. However, such practice has been limited due to damage imparted to the mechanism by force of the resulting detonation except in those instances where the quantity of the charge has been limited to about 1/10 lb. or less at which level the energy of the seismic signal is not substantial.

It will be readily appreciated that regardless of the particular mode of underwater seismic shooting, there may be a misfire from time to time, i.e. a failure of a charge to shoot, due to malfunction in the charge assembly, or elsewhere in the system. In many such instances of misfiring, the assembly, or certain parts of it remain "live," uncontrolled, and retrievable with great difficulty, if retrievable at all.

Offshore seismic exploration, in view of the misfirings that occasoinally occur at the shooting site, with washing ashore of the still "live" elements of the seismic explosive assembly that remain, has presented such hazards to shore areas that in some instances local authorities have deemed it necessary to halt the offshore exploration without assurance that explosive assemblies or components thereof resulting from misfirings will not impair the safety of the adjacent shore areas.

This invention is concerned with a complete explosive charge assembly that can be emplaced and fired, in large numbers, in an offshore exploration area, conveniently, reliably, and rapidly, without high fish kill; and when desired, with delay providing time for travel of the initiated assembly for detonation outside the firing system, and/or without potential danger to adjacent shore areas in case of misfire. The invention is further concerned with seismic exploration method, and system, involving use of such a complete assembly, above described; and with a primer device particularly applicable as a primer element in such a complete explosive charge assembly.

In accordance with the invention a complete explosive charge assembly, ready for firing and particularly applicable to offshore seismic exploration, is provided, which comprises a closed cartridge shell, and a small seismic explosive charge therein; and a percussion initiatable primer device for said charge extending into detonating relationship therewith.

Generally the complete explosive charge assembly of the invention contains means for delay of the priming action of the primer device, and hence the detonation of the main charge, for a predetermined period after percussion initiation so as to provide time for the thus percussion initiated assembly to travel away from the point of percussion initiation for the detonation. Delay of detonation of the main charge is particularly advantageous in those instances in which the charge is supported in a firing system, for the percussion initiation and force from detonation of the still emplaced charge may, of will, impart damage to the firing system. In preferred practice, the main charge of the complete explosive charge assembly is a nitrocarbonitrate (NCN), by which term ("nitrocarbonitrate") is meant there are no sensitizers or other ingredients in that composition which are high explosives, and the mixture will not detonate with a No. 8 blasting cap when packed for shipment.

Accordingly, a now preferred embodiment of complete explosive charge assembly, ready for firing and particularly applicable to offshore seismic exploration comprises a closed cartridge shell containing a small nitrocarbonitrate charge as the main seismic explosive charge and a primer device therefor; said primer device comprising a closed elongated primer shell, including a wall closure member disposed across one end thereof and said primer shell containing (1) an ignition charge, supported in confinement on said wall member so as to be compressed in response to percussion applied to said wall member outside said primer shell, and ignitable in response to compression resulting from said percussion, (2) a high explosive, as a base charge, spaced from said ignition charge, (3) a primer charge intermediate said ignition charge and said base explosive charge, and (4) a slow burning composition, as a delay fuse, intermediate said primer charge and said ignition charge; said base charge being detonatable in response to detonation of said primer charge, and spaced in detonating relationship therewith, said delay fuse composition being ignitable in response to ignition of said ignition charge and spaced in ignition relationship therewith, and said primer charge being detonatable in response to ignition of said delay fuse composition and spaced in detonating relationship therewith; and said primer device supported within the confines of said cartridge shell so as to maintain said base charge in detonating relationship with said main charge. Although delay means, such as a delay fuse, is not required in the primer element, or device, in all embodiments of the complete seismic charge assembly of the invention, it is utilized in preferred practice to delay priming action of the primer charge until after the percussion initiated assembly has had time to travel from the firing system for subsequent detonation in those instances in which damage might, or would, otherwise be imparted to the system by force resulting from the detonation therein.

Generally, in the preferred embodiment of complete seismic charge assembly, above described, the cartridge shell is elongated, and a well member for containing the primer device extends through a wall end closure of the cartridge shell, closed end first, into the main charge so as to support the primer device in the required detonating relationship. The primer device extends, base charge end first, into the well so as to maintain the base charge in the requisite relationship with the main charge, with the percussion sensitive wall portion of the primer device in unobstructed open communication with the outside of the cartridge shell, generally spaced from the interior of the cartridge shell sufficiently to be at least flush with the cartridge shell end closure. Generally, the well member is supported at its open end flush with, or on, the cartridge shell end closure and the primer element extends at least flush with the open end of the well, and preferably to a point just outside the well. In other embodiments of the preferred complete assembly, the primer device can be inserted into the well, percussion sensitive end first, so as to be impacted by force of percussion applied through the closed end of the well, as when moving the complete assembly against a suitable impact means therefor.

Nitrocarbonitrate type explosive charges, as is well known, contain at least one inorganic oxidizer salt, a fuel, and a suitable sensitizer together with various other conventional ingredients such as one or more of an antiset agent, water repellent coating material or the like. Most often ammonium nitrate is the chief inorganic oxidizer salt ingredient alone, or with sodium nitrate or other suitable inorganic oxidizer salts. Further exemplary of inorganic oxidizer salts that can be used alone or together with ammonium nitrate as the inorganic oxidizer salt ingredient of nitrocarbonitrates are alkali metal and alkaline earth metal nitrates and perchlorates (including ammonium) as for example sodium nitrate, magnesium nitrate, calcium nitrate, potassium nitrate, barium nitrate, sodium perchlorate, ammonium perchlorate, calcium perchlorate and magnesium perchlorate. Well known sensitizer materials for nitrocarbonitrates include DNT and particulate aluminum alone or together with suitable fuels such as, for example, powdered coal, fuel oil, ferrosilicon, ferrophosphorous and the like. The following formulations (weight percent basis) are further illustrative of nitrocarbonitrate type charges above described and now preferred in practice of the invention:

|  | A | B | C | D | E | F |
|---|---|---|---|---|---|---|
| Ammonium nitrate [1] | 82 | 91 | 86 | 79 | 91 | 78 |
| Sodium nitrate |  |  |  | 10 |  |  |
| DNT [2] |  | 5 |  | 5½ | 5 | 5 |
| Aluminum [3] | 6 |  | 10 |  |  | 12 |
| Fuel oil | 4 |  |  | 1½ |  | 1 |
| Ferrosilicon | 8 |  |  |  |  |  |
| Ground coal |  | 4 | 4 | 4 | 4 | 4 |

[1] Ground prills, formulations A, B, C and D; granular, formulations E and F.
[2] Dinitrotoluene oil, formulations B, D, and E; solid dinitrotoluene, formulation F.
[3] Flake, formulations A and C; granular, formulation F.

The generally preferred nitrocarbonitrates contain (weight basis) from about 75 to 95 percent total inorganic oxidizer salt and at least 5 percent of a suitable sensitizer component together with a separate fuel component when desired. More often ammonium nitrates, preferably in the form of ground prills, is the only inorganic oxidizer salt although it can be advantageously utilized as such, in an amount of from 75 to 90 percent together with from about 1 to 15 percent sodium nitrate. Now-preferred sensitizer components are DNT oil, DNT solids, particulate aluminum, and mixtures of any two or more thereof, in a total amount of from about 5 to 20 percent, at least about 5 percent of the particulate aluminum being flake. Also, in preferred practice, the nitrocarbonitrate charge contains, as a separate fuel component, fuel oil, ground coal, granular aluminum or a mixture of two or more thereof, in any suitable amount generally from 2 to 15 percent.

When referring herein to small nitrocarbonitrate seismic main charges it is meant those which generally have a weight of from 1/8 to 3 lbs. The complete charge assembiles are generally elongated, and more often cylindrical, and the body of seismic main charge generally has a length of from 3 to 10 inches and a minimum cross sectional dimension or diameter of about 1¾ inches. However, in some offshore exploration areas, selection of the seismic charge is permitted independently of fish kill incurred, and hence a small nitrocarbonitrate charge of any suitable size can be utilized, and indeed the small explosive charge can be a dynamite or other suitable high explosive of similar dimensions.

The completes explosive charge assembly optionally contains means for self-desensitizing and/or self-disarming after a misfire in a water environment, further described and illustrated herein.

The invention further provides a primer device for the preferred complete charge assembly above described, said primer device comprising a closed elongated primer shell, including a wall closure member disposed across one end thereof and said primer shell containing (1) an ignition charge, supported in confinement on said wall member so as to be compressed in response to percussion applied to said wall member outside said primer shell, and ignitable in response to compression resulting from said percussion, (2) a high explosive, as a base charge, spaced from said ignition charge, (3) a primer charge intermediate said ignition charge and said base explosive charge, and (4) a slow burning composition, as a delay fuse, intermediate said primer charge and said ignition charge; said base charge being detonatable in response to detonation of said primer charge and spaced in detonating relationship therewith, said delay fuse composition being ignitable in response to ignition of said ignition charge and spaced in ignition relationship therewith, and said primer charge being detonatable in response to ignition of said delay fuse composition and speced in detonating relationship therewit;h; and said primer device supported within the confines of said cartridge shell so as to maintain said base charge in detonating relationship with said main charge. The delay fuse component of the primer device of the invention is generally selected on basis of the time required for sufficient travel of the initiated charge for detonation outside the system, e.g. from 0.5 to 2 seconds.

Still further in accordance with the invention, a seismic exploration method is provided wherein a complete seismic charge assembly is emplaced in an underwater seismic exploration zone and fired to provide energy for a seismic record, said method comprising delivering said complete seismic charge assembly into said zone, and said assembly comprising (1) a closed cartridge shell containing a small seismic explosive charge and (2) a percussion initiatable primer device for said seismic charge, including means for delay of priming action of said device after percussion initiation of same, and said primer device extending into detonating relationship with said seismic charge; and then, in said zone, directly impacting said percussion initiatable device to percussion initiate same with subsequent detonation of said seismic charge; and during the period of said delay, directing the thus initiated seismic charge assembly away from the point of its percussion initiation.

Another embodiment of underwater seismic exploration method is provided wherein a complete siesmic charge assembly is emplaced in an underwater zone and fired to provide energy for seismic record, comprising towing a tube, extending into, and terminating in, said zone; said complete seismic charge assembly to be fired comprising (1) a closed cartridge shell containing a small seismic explosive charge and (2) a percussion initiated primer device for said seismic charge, and said primer device extending into said cartridge shell into detonating relationship with said seismic charge with the percussion initiating means for said device in direct and open communication with the outside of said shell; delivering said complete seismic charge assembly through said tube into said zone and therein directly impacting said percussion initiating means to thereby initiate said primer device with subsequent detonation of said seismic charge.

In preferred practice of the method of the invention, a delivery hose, or tube, is extended from the charge supply point, generally from the deck of a tow boat, into the seismic shooting zone, and then towed through the seismic test area. Sequentially a plurality of the charge assemblies are then conveyed through the hose to the shooting site, and impacted in any suitable manner. Generally, the main charge of the explosive assembly is a small nitrocarbonitrate, and the percussion sensitive portion thereof is either positioned about flush with an outside surface of the charge assembly shell, or, more preferably, just sufficiently outside the shell to be adjacent an exterior surface thereof.

Further in accordance with the invention, a system for generating seismic disturbances in an underwater zone utilizing a complete seismic charge assembly of the invention is provided, said system including a movable platform; means on said platform for storage of percussion initiatable seismic charge assemblies, and each said charge assembly comprising (1) a closed cartridge shell, and a small seismic explosive charge therein and (2) a percussion initiatable primer device for said charge extending into detonating relationship therewith; a delivery conduit extending from said platform into said zone, for delivery of such charge assemblies into said zone for percussion initiation of same; means for sequentially loading such complete charge assemblies from said platform into said delivery conduit and for moving same, under fluid pressure, therethrough; and means in said zone for sequentially receiving said charges from said conduit and impacting same to thereby percussion initiate said primer device with subsequent detonation of said seismic charge to produce said seismic energy.

In preferred form, the system of the invention utilizes a complete seismic charge assembly in which the primer device contains means for delay of its priming action after the percussion initiation. The delay means is generally a conventional type of delay fuse assembly to provide sufficient delay following percussion initiation, to permit the charge assembly to travel from the point of impact, for the detonation, to eliminate possible damage to the firing system that would otherwise occur.

Figure 1A:
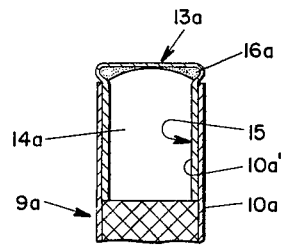
Figure 1B:
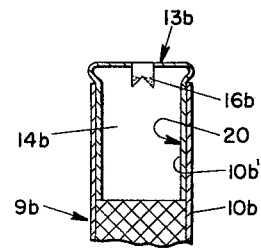
Figure 2:
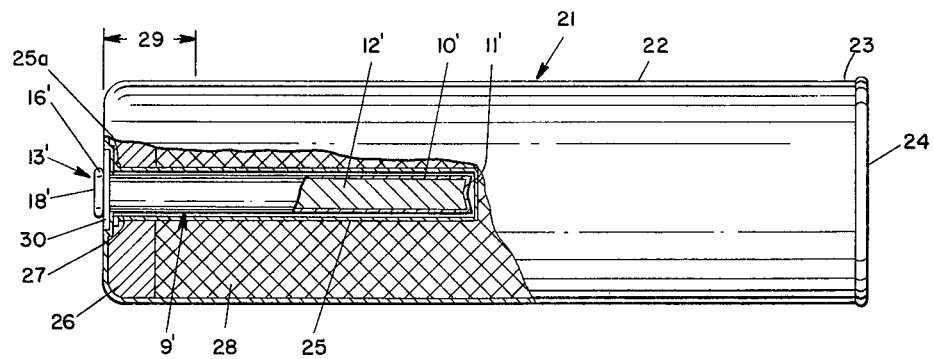
Figure 2A:
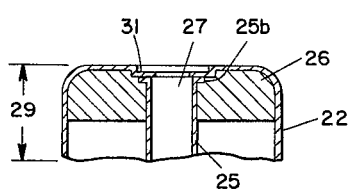

The invention is further illustrated with reference to the drawings of which FIG. 1 is a cross sectional view of one form of percussion initiatable primer device suitable as a primer element of a complete charge assembly of the invention, and FIGS. 1A and 1B are views of nowpreferred embodiments of initiating means therefor; FIG. 2 is a cross sectional view of a complete seismic charge assembly of the invention, including a primer device of FIG. 1 as the primer element, and FIG. 2A is a view of the primer-end closure of the assembly of FIG. 2 without the primer element extending therethrough; FIG. 3 is illustrative of the primer device of the invention which differs from that of FIG. 1 by the presence of a delay fuse for delay of the priming action, FIG. 3A is a partial view of the primer of FIG. 3 but differing therefrom with reference to the type delay fuse utilized, and FIGS. 3B and 3C illustrate means for self-disarming and/or self-desensitizing any primer element described herein, in the event of an underwater misfire; FIG. 4 is illustrative of a nowpreferred complete seismic charge assembly of the invention, and FIGS. 4A–4E are illustrative of means for selfdisarming and/or self-desensitizing the main explosive charge of the assembly of FIG. 4 in the event of an underwater misfire; and FIGS. 5 and 5A are illustrative of method, and system, of the invention.

Referring to FIG. 1, elongated shell 10, of primer device 9, contains a high explosive base charge 12, such as PETN, adjacent closed end 11. Wall, or cap, closure 13 is disposed in any suitable manner on, and across, the top and open end 14 of shell 10 in closing relationship therewith. Ignition charge 16, in shell 10, is supported in confinement, in any suitable manner, on wall 13, such as in a partially closed cavity 17 about the outer periphery of cap closure 13. Inasmuch as open end 14 is adjacent ignition charge 16 and communicates charge 16 with the remainder of the components of the device, it is also referred to herein as the ignition end of shell 10.

Confined ignition charge 16 is any suitable ignition composition which ignites to produce a flame in response to compression resulting from percussion applied to the outer surface 18 of cap 13. Primer charge 19 in shell 10 is any suitable primer composition intermediate high explosive charge 12 and ignition charge 16, detonatable in response to direct contact with flame emitted from ignition of ignition charge 16, and spaced in such detonating relationship with charge 16. High explosive 12 is detonatable in response to detonation of primer charge 19 and is disposed in shell 10 in detonating relationship therewith.

In preferred practice, and as specifically illustrated, primer assembly 19 comprises a diazodinitrophenol wafer 19a pressed above, and superposed on, elongated capsule 19b, which extends within, and substantially coaxially with, shell 10, in closing or near closing relationship therewith. Capsule 19b is open at each end and is superposed on base charge 12 and contains a second diazodinitrophenol charge 19c of density lower than that of primer wafer 19a. Wafer charge 19a is of sufficiently high density to be ignitable in response to contact with flame from ignition of charge 16, as above described, and diazodinitrophenol charge 19c is of sufficiently low density to be detonatable in response to heat developed by ignition of wafer charge 19a to thereby in turn cause detonation of base charge 12.

In FIGS. 1A and 1B, which illustrate now-preferred embodiments, each lettered index number refers to a like part of FIG. 1 identified therein by the same, but unlettered, number. With reference to FIG. 1A, the ignition end 14a of shell 10a is closed by a conventional rim-fired empty primed rifle cartridge casing 15, which includes end closure 13a with charge 16a for rim firing, and casing portion 10a'; and with reference to FIG. 1B, the ignition end 14b of shell 10b is closed by a conventional center fired empty primed rifle cartridge casing 20 which includes end closure 13b with charge 16b for center firing, and casing portion 10b'. Casings 10a' and 10b' are of outside diameters sufficiently less, respectively, than the inside diameters of shell 10a and 10b, to provide, in each instance, for an interference, or friction, fit of the case closure in the primer shell.

With reference to FIG. 2, all primed index numbers refer to like parts of FIG. 1 identified therein by the same, but unprimed, index number. Complete seismic charge assembly 21 comprises elongated cartridge shell 22 closed at the bottom end 23 by any suitable closure means such as crimped on closure 24 and at the other end by closure means 26 secured to shell 22 in any suitable manner and containing passageway 27 extending therethrough in direct communication, and in substantially axial alignment with, the interior of shell 22.

Primer assembly 9', of the invention, extends end 11' first, through passageway 27 of end closure 26 into well member 25 in shell 22, sufficiently to dispose explosive charge 12' in detonating relationship with nitrocarbonitrate charge 28. Primer assembly 9' is preferably disposed entirely within closure 26 and nitrocarbonitrate charge 28 except to permit primer end closure 13' to be flush with the exterior surface of closure 26, and preferably to permit both wall closure 13' and charge 16' thereon to protrude from the end of member 26, in either event, to enable direct application of percussion force outside shell 22 to surface 18' for compression and ignition of charge 16'.

Passageway 27, and support for well member 25, in closure 26 are more clearly shown in FIG. 2A, which is a view of end portion 29 of cartridge assembly 21 without primer device 9'. Primer device 9' in well member 25 is supported in opening 27 in the end member 26 of assembly 21 in any suitable manner, as for example by a bushed frictional fit in the open end of well 25. Well 25 is supported in opening 27 in watertight relationship with the interior of shell 22 in any suitable manner such as by flange, or lip, 25a integral with well member 25 at the open end thereof and seated and sealed in recess 25b in closure 26 immediately below, and coaxial with, recess 31. Washer 30, in recessed portion 31 of closure 26 immediately subjacent closure 13', encompasses opening 27 as an anvil type support for closure member 13' at the time percussion force is applied to compress and responsively ignite ignition charge 16'. In one such embodiment closure 26 is advantageously formed from a plastic material, and shell 10' of primer device 9' is metal and is firmly supported in passageway 27 at its upper end.

End closure 26, in assembly 21, is advantageously a plastic material of contour the same as that of the inner wall of shell 22 and is inserted into watertight closing relationship with shell 22. In the embodiment shown, plastic end member 26 and shell 22 can be a plastic unit of integral construction formed by injection molding. Now-preferred plastic materials for the formation of the integral unit of shell 22 and closure 26 are polypropylene, polystyrene, and the like.

When utilizing an empty primed rim-fired, or center-fired rifle cartridge case as an end closure for the primer device of the invention, the rifle case portion can be of any desired length, such as in the order of about ⅜ inch. From about 3 to 4 grains of the ignition charge 16a and 16b is generally employed although the amount is variable dependent upon the particular ignition and primer charges contemplated. The primer device 9, generally cylindrical, is generally from about 2¼ to 3 inches in length by about 0.246 to 0.248 inch in diameter.

The amount of high explosive 12, in the device of FIG. 1, is generally greater than that utilized as base charge in a conventional No. 8 blasting cap. For example, the amount of PETN, as charge 12 in FIG. 1, is generally in the order of from 0.8 to 1.5 grams as compared with a conventional amount of 0.4 gram utilized as base charge in a No. 8 electric blasting cap. The amount of primer charge, e.g. charge 19, is generally about the same as utilized in a conventional No. 8 blasting cap, e.g. from 0.28 to 0.30 gram.

In one form of preferred practice, the initiator primer device, such as of FIGS. 1A and 1B can be fabricated by insertion of an empty primed rim-fired, or center-fired, rifle cartridge casing as the open end closure, in a fuse cap of standard design which is an elongated shell containing a base explosive charge and a primer composition superposed thereon and containing an empty (open) end portion for accepting a detonating fuse for initiation of the primer.

With reference to FIG. 3, all double primed index numbers refer to like parts of FIGS. 1 and 1A defined therein by the same, but unprimed numbers. Thus, in the primer device 6 of FIG. 3, elongated shell 10"a contains a high explosive base charge 12" such as PETN, adjacent closed end 11". The ignition end 14"a of shell 10"a is closed by a conventional rim-fired empty primed rifle cartridge casing 15", which includes end closure 13"a with charge 16"a for rim firing, and casing portion 10"a; and the outside diameter of casing 10"a' and the inside diameter of shell 10"a are adjusted to provide, an interference, or friction, fit of the casing closure in the primer shell.

Although a conventional rim-fired closure assembly of FIG. 1A is preferred, as illustrated with reference to FIG. 3, any suitable percussion initiating means can be utilized, as illustrated with reference to closure assembly 13 of FIG. 1, and with reference to FIG. 1B illustrative of a center-fired closure casing.

Confined ignition charge 16"a, as described with reference to FIG. 1A, is any suitable ignition composition which ignites to produce a flame in response to compression resulting from percussion applied to the outer surface 18"a of closure cap 13"a. Primer assembly 19" in shell 10"a is any suitable assembly of primer composition, intermediate high explosive charge 12" and ignition charge 16"a. Delay fuse assembly 8, containing slow burning delay fuse composition 7 is of the type conventionally used as a delay element in electric delay blasting caps, and is disposed intermediate primer assembly 19" and ignition 16"a. Delay composition 7 is ignitable in response to direct contact with flame emitted from ignition of ignition charge 16"a and is spaced in such ignitable relationship therewith. The primer composition of assembly 19" is ignitable (19"a) and detonatable (19"c) in response to heat and flame emitted from burning of delay fuse composition 7 and is disposed adjacent to delay fuse composition 7 in such detonating relationship therewith. High explosive charge 12" is detonatable in response to detonation of the primer charge of assembly 19" and is disposed adjacent the assembly 19" in that detonating relationship.

As illustrated with reference to FIG. 1, the primer charge of assembly 19", and base charge 12"', are advantageously those utilized as such in the blasting cap art, for example base high explosive charges 12" such as pentaerythritoltetranitrate, pentolite, cyclonite, tetryl, RDX, cyclotol and the like; and primer charges such as diazodinitrophenol, lead azide and mercury fulminate. Confined ignition charge 16"a components include potassium perchlorate, lead styphnate, mercury fulminate, antimony sulphide and lead azide and mixtures of such materials as are well known in the munitions art, and are preferably those often utilized as the "primer" charge in 0.22 caliber rifle cartridges. Delay fuse compositions 7 include those normally utilized as such in the delay blasting cap art, those now preferred including lead oxide/boron, 98/2; red lead/boron, 98/2; barium peroxide/tellurium/selenium, 40/40/20; barium peroxide/selenium, 84/16; and barium peroxide/tellurium, 60/40.

As described with reference to FIG. 1, primer assembly 19", in preferred practice, comprises a diazodinitrophenol wafer 19"a pressed above and superposed on elongated capsule 19"b which extends within and is substantially coaxially with shell 10"a in closing, or near closing, relationship therewith. Capsule 19"b is open at each end and is superposed on base charge 12" and contains a second diazodinitrophenol charge 19"c of density lower than that of primer wafer 19"a. Wafer charge 19"a is of sufficiently high density to be ignitable in response to heat and flame from ignition of delay fuse composition 7, as above described and diazodinitrophenol charge 19"c is of sufficiently low density to be detonatable in response to heat developed by ignition of wafer charge 19"a to thereby in turn cause detonation of base charge 12".

An alternate form of delay fuse assembly for a primer device of the invention is illustrated with reference to FIG. 3A which is a partial view of primer device 6 of FIG. 3 containing alternate delay fuse system 8', and in which like parts of FIG. 3 are like numbered. Delay fuse assembly 8', in place of delay assembly 8 of FIG. 3, comprises a substantially coaxially extending lead tube 8" in shell 10"a in closing relationship therewith, and delay fuse composition 7' is the same as composition 7 of FIG. 3, but is pressed as a core in tube 8", say to a press of about 6000 p.s.i. Core type delay assembly 8' is of a type conventionally used as a delay element in the delay electric blasting cap art.

A primer device of the invention containing self-desensitizing and/or self-diasarming structure is illustrated with reference to FIGS. 3B and 3C each of which is a partial view of primer device 6 of FIG. 3, and in which like parts of FIG. 3 are designated by like index numbers. Referring specifically to FIG. 3B, bottom end 11" of shell 10"a contains an open and unobstructed passageway 41 communicating base charge 12" with the outside of shell 10"a. Passageway 41, when the primer device is underwater, conveys water from outside shell 10"a into base charge 12". The size of passageway 41 is correlated with at least one "live" component of shell 10"a, viz, at least one of the group of base, primer, delay and ignition charges with shell 10"a so as to convey water in an amount to desensitize all or at least one of those charges after a predetermined period of time following emplacement of the seismic charge assembly, containing the primer device, in the water covered area. Generally it is desired to convey a sufficient amount of water through passageway 41 for infiltration of both base charge 12" and the primer charge of assembly 19" particularly when the primer charge is diazodinitrophenol. It is an important requisite that the size of passageway 41 is limited so as to preclude sufficient water flow to cause desensitization prior to expiration of the predetermined period of time.

It is necessary, of course, that the complete explosive assembly remain operative for the predetermined, or preset, period to permit a suitable amount of time for emplacing the assembly in the water covered shooting area, and shooting. This preset period of time is generally at least 15 minutes and is often as long as 30 minutes up to 1 hour and sometimes longer although the particular time period is not critical. The size of the passageway 41 is dependent therefore on the predetermined time period selected, the particular primer assembly component or components to be desensitized and/or disarmed and, density and particle size of those components in shell 10"a. With reference to FIG. 3C is shown structure of FIG. 3A except that passageway 41', generally larger than passageway 41 is covered by a water deteriorable member 42 at the inner wall of shell 10"a, as a closure therefor. Water resistant closure 42 serves sufficiently as a water barrier to protect the interior of shell 10"a from ingress of the sensitizing and/or disarming amounts of water during the entire operating period, i.e. the predetermined period of time allowed for normal operation, but becomes sufficiently disintegrated, or it dissolves, in response to deteriorating action of the water in contact therewith, to allow passage of water therethrough into the shell for the requisite desensitization or disarming after the preset period. Exemplary materials forming element 42 are paper, and a water soluble material such as Klucel (hydroxypropyl cellulose), CMC, poly(vinyl alcohol), and the like.

In most embodiments of FIGS. 3B and 3C both self-disarming and self-desensitizing occur as result of ingress of water to deactivate, or to dissolve or mechanically cause removal of, one or more of the primer device components from the shell 10"a through the passageway.

The self-disarming and/or self-desensitizing structure, per se, described with reference to FIGS. 3B and 3C are disclosed in U.S. Patent 3,358,601.

In embodiments of FIGS. 3B and 3C, self-disarming can also be accomplished after the preset time period when the shell 10"a is (1) formed, at least in part, from a metal, and (2) contains a material which upon contact with water forms an agent sufficiently corrosive to the metal to cause disintegration of the shell to thereby permit flow of one or more of the primer components into the surrounding water environment, after the preset period for firing, to thereby render it harmless. Thus water by ingress via passageway 41 (FIG. 3B) or 41'

(FIG. 3C), in entering the shell comes in contact with the corrosion agent-forming material to form the corrosion agent for the disarming. Although any suitable corrosion agent-forming material can be included in one or more of the base, primer, and delay compositions, sulfur is now a preferred corrosion agent-forming material and it is generally most advantageously incorporated into the primer composition. Sulfur thus reacted with water forms sulfuric acid upon contact with the incoming water; which, in turn reacts with the metal shell, generally aluminum or copper or bronze, to destroy a sufficient proportion to provide for egress of the shell contents, either mechanically carried with water or dissolved therein.

In all events, the corrosion agent-forming material is present within shell 10"a in an amount sufficient to form the required amount of corrosion agent for reaction with the shell metal to cause the necessary shell disintegration, and is disposed within shell 10"a such that the corrosion agent, when formed, is in, or can readily move into, contact with the shell metal for reaction therewith.

When desired, the capsule 19"b and shell 10"a of the primer device of FIGS. 3B or 3C can be formed from dissimilar metals to thereby set up an electrolysis type reaction between the two metals to facilitate the corrosion agent-metal reaction.

Self-disarming by formation of a corrosion agent, as described, is disclosed, per se, in U.S. Patent 3,356,024.

A now preferred embodiment of a complete percussion initiatable seismic charge assembly of the invention contains a delay fuse assembly and a rim-fired rifle cartridge casing closure as the percussion sensitive portion and is illustrated with reference to the assembly of FIG. 4 in which the primer element is that of FIG. 3 and in which all like parts of FIG. 3 are identified by like numbers. Referring to FIG. 4, primer assembly 6 extends into primer well 43, percussion end 13"a last, and terminates in detonating contact with main charge 44 in cartridge shell 46 of the complete assembly 45. Primer device 6 is preferably disposed entirely within the shell 46 interior except to permit the primer end closure 13"a, at its outside surface 18"a, to be at least flush with the exterior surface of well 43 at the open end thereof and preferably to permit both the top surface 18"a and the ignition 16"a portions to protrude from well 43 into the top recessed shell portion 47'.

Recessed shell portion 47' formed by spacing shell top closure 47 downwardly from topmost end, or rim 48, of shell 46, is optional but, by its extending wall members, provide protection against undue impact of the percussion sensitive portion of the cartridge assembly 45 during handling and prior to shooting. Also, dependent on the particular firing system, the wall members forming recess 47' serve to guide the impacting means into percussion initiating contact with the percussion sensitive portion 13'a. The empty rim-fired rifle cartridge case 15" as the end closure 13"a, can be of any desired length, such as in the order of about ⅜ inch; and around about 0.1 to 0.4 grain of the ignition charge 16'a is generally utilized. The primer element, or device 6, is generally cylindrical and in most embodiments is from about 2¼ to 3 inches in length by about 0.246 to 0.248 inch in diameter.

Alternative embodiments of the complete seismic cartridge assembly of FIG. 4 utilizing self-desensitizing and/or self-disarming means, for the main charge, are illustrated with reference to FIGS. 4A–E inclusive each of which shows a part section of FIG. 4, and in each of which like parts of FIG. 4 are like numbered. Each of FIGS. 4A, 4B and 4C includes a topmost end section of assembly 45, each containing self-desensitizing and/or disarming means in the top end closure member. Referring to FIG. 4A, assembly 45 contains top end closure member 51 in lieu of closure 47 of FIG. 4. Plug 52, formed from a water deteriorable material, such as Klucel described hereinabove, extends through closure 51 into shell 46 in direct communication with main charge 44. In preferred practice, a passageway through end closure 51 is formed, generally having a cross sectional area equivalent to a circular cross section of about ⅛ inch diameter, and a mass of the water deteriorable material is riveted into the passageway and then pressed to form plug 52 into the requisite water tight relationship. FIG. 4B is a view exactly the same as that of FIG. 4A except that the assembly 45 contains top end closure member 53 in lieu of closure 51 of FIG. 4A. Closure member 53 contains a passageway 54, of about the same size as that containing plug 52 of FIG. 4A, extending therethrough into direct open communication with the interior of shell 46. Passageway 54 is closed by a sheet 56 of water deteriorable material in shell 46, supported in water tight contact with closure member 53 by suitable adhesive and which is formed from a material such as that forming plug 52 of FIG. 4A.

Plug 52 and sheet 56 are each of thickness sufficient to maintain water tight relationship with the respective shell closure members, but, after a predetermined time for normal operation, to yield to the deteriorating action of water and permit water ingress through the passageway into the shell for the disarming and/or desensitizing in exactly the same manner as described with reference to deterioration of member 42 of FIG. 3C.

FIG. 4C is a view exactly the same as that of FIG. 4B except that it contains top end closure member 57 in lieu of closure member 53 of FIG. 4B. Closure 57 contains passageway 58 extending therethrough into open communication with the interior of shell 46, and is of smaller cross sectional area than that of passageway 54 of FIG. 4B. The size of passageway 58 is correlated with the predetermined time period for normal firing, and the particular main charge solubility, to permit ingress of water into shell 46 immediately upon emplacement of the assembly 45, but in an amount insufficient to effect disarming and/or desensitization prior to expiration of the preset period.

When desired, more than one plug 52 structure of FIG. 4A or more than one covered passageway structure of FIG. 4B can be utilized, or one or more of the one can be combined with one or more of the other, to provide a top shell closure member, e.g. member 47 (FIG. 4) with a plurality of self-disarming and/or self-desensitizing means.

Each of FIGS. 4D and 4E includes a bottommost end section of assembly 45 each containing self-desensitizing and/or self-disarming means in the bottom end closure member. Referring to FIG. 4D, cartridge shell 46 contains in the bottom end thereof, i.e., opposite the percussion end, an open unobstructured passageway 59 for ingress of water into cartridge shell 46 for disarming and/or desensitizing main charge 44 as demonstrated specifically with reference to FIG. 4C. Similarly, FIG. 4E illustrates an open passageway 61 in the bottom end of shell 46 covered with a sheet of a water deteriorable material 62 superposed over and closing passageway 61 to permit ingress of water into shell 46 after deterioration of the material 62 in the same manner as illustrated with reference to cover 56 of FIG. 4B.

Correlations of dimensions of the passageways of FIGS. 4A–4E, dimensions and selection of cover, or plug, compositions of FIGS. 4A, 4B and 4E are dependent upon the degree of water ingress sought, the water solubility of the particular explosive charge 44 and the degree of water deteriorability of the cover material. In all events, the correlations permit the required ingress of water after the preset period above described. Generally in practice of any of the self-desensitizing and/or self-disarming embodiments of FIGS. 4–4E inclusive, a self-disarming and/or self-desensitizing embodiment of FIGS. 3B or 3C is also utilized so as to render the complete seismic explosive assembly self-desensitizing and/or self-disarming of both the main explosive charge and one or more of the components in the primer element.

In still another embodiment, the well member of the complete assembly, i.e. for support of the percussion initiatable primer, such as well member 43 of FIG. 4, can be formed from a water soluble, or otherwise water deteriorable material so as to fail in contact with the water after the preset period and to permit water ingress into the cartridge shell. Such primer well structure, per se, is disclosed in the copending application of Driscoll, Ser. No. 634,766 filed Apr. 28, 1967.

In the embodiment of FIG. 4, the percussion initiatable primer device 6 can be supported within the well 43 in any suitable manner, such as by longitudinally extending ribs on the inner wall of well 43 to frictionally engage the primer 6.

Well member 43 can be supported at its open end in end closure 47 of FIG. 4 in any suitable manner, generally by support of an integral lipped open end 43A thereof on the exterior surface of well closure 47, often on a recessed portion of wall 47, as shown.

The complete seismic charge assembly of the invention, e.g. assembly 45 of FIG. 4, can be delivered to the underwater shooting site in any suitable manner say at a depth of from about 20 to 50 feet. The complete seismic assembly of the invention eliminates need for the various communication lines necessary for firing conventional electrically initiated seismic charges, and can be rapidly assembled at the shooting site and emplaced, and then quickly and reliably fired in large numbers. It is free from those safety hazards characteristic of electrically fired assemblies, involving premature firing caused by static charges and strong currents.

One method in accordance with which the complete seismic charge assembly of the invention can be delivered to the underwater shooting zone, and then fired, comprises loading a delivery conduit extending into the seismic shooting zone for sequential delivery of the complete assemblies for percussion firing in the exploration area. Any suitable means for impacting the complete assembly, for percussion initiation of same, in the shooting zone, can be utilized. In one such embodiment the delivery conduit and a rigid impact body is towed from a deck of a boat moving along the water surface above the shooting zone. The rigid impact body can be a plate disposed in a plane substantially perpendicular to the axis of the conduit at its terminating end and is secured to the conduit, or directly to the boat, in any suitable manner. As the conduit and plate members are towed through the shooting zone, each seismic charge assembly is passed, primer end first, from the boat deck through the delivery conduit and into direct contact of the primer end with the rigid impact member. The resulting force of percussion on the primer end causes compression and responsive ignition of the confined ignition charge, thus initiating the primer device with subsequent detonation of the main seismic charge.

The above described method for emplacement of, and firing, a complete seismic charge assembly of the invention, and a system for carrying it out are illustrated with reference to FIG. 5. Referring to FIG. 5, complete seismic charge assemblies 21 of FIG. 2 are sequentially loaded from charge storage 64 on deck 66 of boat 67 into loader, or breech block 68 also on the boat deck, for delivery of same, percussion sensitive end portion 13' first, into delivery conduit 69. Each charge assembly 21 is then passed through conduit 69 into the underwater shooting zone and, from conduit 69 into direct contact of the closure member 13' of the primer device with impact plate 71. Impact plate 71 is supported in the seismic shooting zone, by attachment to the terminating end of conduit 69 by connecting cables 72 and paravanes 73. Cables 72 and paravanes 73 serve collectively to stabilize the position of impact plate 68 substantially as shown during towing.

Water, from pump system 73, on the boat deck 66, is passed under pressure through line 63 into loader 68 against assembly 21 at its rearward end 24 as a driving force for moving assembly 21 through conduit 69 and to provide the necessary momentum for the impact of assembly 21 with plate 71 to accomplish the required force of percussion against closure 13' for compression and ignition of charge 16 for subsequent detonation of the main charge 28 in assembly 21.

When the percussion primer of the main charge assembly is devoid of a delay fuse, as is primer 9' of assembly 21 of FIG. 2, impact plate 71 is spaced from the end of conduit 69 a sufficient distance to permit assembly 21 to emerge completely from conduit 69 before being fired, so as to eliminate possible damage to the conduit 69 by force of the resulting detonation. That practice, at times, presents operational problems due often to a decrease in stability of position of the plate 71 and/or loss in the necessary momentum for the impact of the assembly against the plate, at spacings sometimes deemed necessary to assure that there will be no damage imparted to the conduit by the force of the detonation. However, in preferred practice utilizing a delay fuse in the percussion initiatable primer of the complete charge assembly, the impact plate is spaced from the end of conduit 69 only sufficiently to permit the charge to emerge completely from the conduit, with impact taking place precisely at that point and the final detonation being delayed until the assembly has time to travel away from the plate and the end of the conduit, a sufficient distance to preclude damage to the conduit and/or plate by force of the detonation. In that practice, the assembly 21 to be fired contains a delay type primer unit such as that of FIGS. 3 or 3A in place of primer 9' (FIG. 2), and the choice (and amount) of delay fuse composition is determined by the delay time desired, generally from 0.5 to 2 seconds.

The system of FIG. 5 includes streamer cable assembly 74, of conventional design, which comprises a hydrophone cable 76 and tow cable 77. Cable 76 contains a plurality of hydrophone groups 78 connected in spaced apart relationship along the entire length thereof, and connected at one end by tow cable 77 to reel assembly 60 on boat deck 66 for reeling and towing. Suitable well known means (not shown) are associated with streamer cable assembly 74 to stabilize its position at a predetermined depth in the body of water; and suitable means (not shown) for communicating hydrophone groups 78 with recorder means on the boat deck, extend from within cable 76 alongside tow cable 77 via reel assembly 60.

As streamer assembly 74 is towed through the water body, the seismic charges are detonated to initiate seismic shock at the predetermined points in the test area. Disturbances produced by the shot, or shock, are detected by the hydrophone groups which convert those pressure variations into electric signals which are then communicated to the boat for recording.

By way of example, 25 assemblies of FIG. 2 were initiated by percussion force of a free falling hammer on the primer surface 18'. The ignition system in each assembly, including element 13', was an empty primed cartridge case 15 of FIG. 1A. In each instance the main charge 28 was completely detonated.

Each of the 25 assemblies had the same specifications, which are tabulated as follows:

COMPLETE ASSEMBLY 21

Primar 9':
    Metal Shell 10'—Aluminum, cylindrical
        Length, inches—2.25
        Diameter, inches:
            Inside—0.225
            Outside—0.246
    Ignition End 13'—0.22 caliber empty short primed rim-fired rifle cartridge case Primer—Ingition 19' [1]:
    Diazodinitrophenol, grams—0.29
        Above capsule—Pressed under 3700 p.s.i.
        Below capsule—Loose
    Base Explosive Charge 12' PETN, grams—1.2, pressed under 3700 p.s.i.
Shell 22': Aluminum, cylindrical
    Length, inches—6
    Diameter, inches:
        Inside—1.92
        Outside—2.00
Main Explosive Charge 28:
    Weight, lb.—0.5
    Length, inches—4.25
    Diameter, inches—1¾
    Density, gms./cc.—1.02
    Composition, wt. percent:
        Ammonium nitrate—78.7
        DNT—5.0
        Paraffin oil—1.5
        Particulate aluminum—14.8

[1] Index number not shown in FIGURE 2.

By way of further example, and further referring to FIG. 5 together with reference to FIG. 5A, 187 complete seismic charge assemblies of the invention were sequentially fired in an underwater seismic zone in a firing device disclosed and claimed in the above referred to U.S. application for patent of R. R. Larson filed concurrently herewith. All assemblies were percussion initiated, and following the delay period, detonated. Each of the 187 complete seismic charge assemblies thus fired was that described herein with reference to FIG. 4 and had the following specifications:

PRIMER UNIT

Metal Shell 10''a—Metal, cylindrical
    Length, inches—2.98
    Diameter, inches:
        Inside—0.22
        Outside—0.24
Ignition End Closure 13''a—Empty, primed rim-fired cartridge case for 0.22 cal. short ammunition
Delay Fuse Assembly 8:
    Fuse Powder:
        BaO$_2$/Te/Se/Pb-Sn(32/32/16/20 [2])
        Pressed, p.s.i.—6000
        Grams—0.4
        Length, inches—0.16
        Diameter—0.22
        Spaced from ignition end, inches—0.43
Primer-Ignition 19'':
    Diazodinitrophenol, grams—0.29
        Above capsule (19''a)—Pressed at 5000 p.s.i.
        Below capsule (19''b)—Loose
Base Charge 12'':
    PETN, grams—1.5, pressed at 6500 p.s.i.

Cartridge Unit

Metal Shell 46—Metal, cylindrical
    Length, inches—4.68
    Diameter, inches:
        Inside—2.04
        Outside—2.09
    Recess 47', inches length—0.41
NCN Charge 44:
    Weight, grams—250
    Length, inches—3.27
    Diameter, inches—2.04
    Composition, wt. percent:
        Ammonium nitrate—78.7
        DNT—5.0
        Fuel Oil—1.5
        Particulate aluminum—14.8

[2] Pb/Sn, 85/15.

With reference to FIGS. 5 and 5A, the complete seismic charge assemblies 45 (FIG. 4) were sequentially loaded (FIG. 5) on boat deck, with the percussion end facing the firing device, into a delivery hose 69a (FIG. 5A), the same as hose 69 of FIG. 5, and delivered under force of water pressure through hose 69a in the manner illustrated with reference to FIG. 5 for delivering charges 21 from the boat deck through the delivery hose 69. As further shown with reference to FIG. 5A, the charge assemblies 45 were sequentially delivered, percussion sensitive end (ignition end 13''a, FIG. 4) first, from the hose 69a into and through a charge conveying conduit 81, of a firing device 80, to a guide member 82 and into and along a forward path of travel (arrow *a*, FIG. 5A) on guide 82, substantially axially with conduit 81, into impact with a pin member 83, the latter supported in fixed position in said path of travel for interception-contact with the percussion sensitive end of each forwardly traveling charge assembly. The momentum of each charge, at time of contact with pin member 83, was, in response to force of water pressure from line 69a, sufficient for percussion initiation of each charge by the resulting impact with the pin member 83.

The pin member 83, wheel shaped, was disposed in a plane codirectional with the path of travel of the charge assembly along a forward path of travel on guide member 82 so as to contact a rim portion 83a of the wheel with the percussion sensitive end 13''a (FIG. 4) of the charge assembly. The length of the guide member 82 was sufficiently greater than that of each charge assembly 45 so as to permit a gap between the rear end 45' of the charge assembly 45, when emplaced for percussion contact, and the forward end 81' of the conveyor conduit 81. In this manner when each charge assembly was in percussion contact with pin 83, flow of water under pressure from conduit 69a diverted from conduit 81 through the gap to the outside of the device thereby destroying the equilibrium of the emplaced charge assembly and, in combination with the firing pin as a pivot, causing pivotal travel of the charge from the device into the adjacent underwater seismic area, i.e. outside the firing system.

The firing device 80 was of integral construction, formed by cutting a relief from an end section of a tube and had an overall length of 16.6 inches, the length of the charge conveyor conduit 81 was 13.5 inches with a rearward most portion thereof tapered along a distance of 8 inches from an inside diameter of 3 inches to a constant 2.28 inches inside diameter over the remaining conduit 81 length; the guide member 82 was 5.1 inches in length and was formed in an arc of about 180°. The wheel type pin member was a disc about 2.0 inches in diameter rotatably supported at its hub, by suitable bracket means 85 at the forward end of guide member 82, and was spaced from conduit 81 a sufficient distance to allow requisite spacing of the charge assembly for formation of the above described gap at the time of percussion contact of the firing assembly with the wheel type pin assembly.

The charge assemblies 45, sequentially loaded on boat deck (deck 66, FIG. 5) were transported to the firing device 80 through a 3 inch by 80 foot flexible delivery hose 69a connecting with the on-deck breech block (block 68, FIG. 5) and extending into the underwater seismic area zone to a depth of about 25 feet and there connecting with the firing device 80 which was under tow by the boat at a speed of from 5 to 7 knots. The transport time, i.e. time for travel of each charge from the boat deck to the firing device and percussion initiation of same was in the order of from 5.7 to 6 seconds, and the duration between sequential loadings into the hose 69a was in the order of from about 10 to 12 seconds.

Each assembly delivered to the firing device was percussion initiated therein and then, during the delay period, was pivotally directed away from the device for the detonation which took place in each instance outside the system, as evidenced by no damage imparted to the firing device by force of the resulting detonation. The delay period for each firing, regulated by selection and amount of the delay fuse composition, was 1.0 second.

It will be evident to those skilled in the art, various modifications can be made or followed, in light of the foregoing disclosure and discussion without departing from the spirit or scope of the disclosure or from the scope of the claims.

What we claim and desire to protect by Letters Patent is:

1. A complete seismic charge assembly ready for firing, comprising a closed cartridge shell containing from ⅛ to 3 lbs. of a nitrocarbonitrate charge as the main seismic explosive charge and a percussion initiatable primer device therefor; said primer device comprising a closed elongated primer shell, including a wall closure member disposed across one end thereof and said primer shell containing (1) an ignition charge, supported in confinement on said wall member so as to be compressed in response to percussion applied to said wall member outside said primer shell, and ignitable in response to compression resulting from said percussion, (2) a high explosive, as a base charge, spaced from said ignition charge, and (3) a primer charge intermediate said ignition charge and said base explosive charge; said base charge being detonatable in response to detonation of said primer charge and spaced in detonating relationship therewith, and said primer charge being detonatable in response to ignition of said ignition charge and spaced in detonating relationship therewith; and said primer device supported so as to maintain said base charge within the confines of said cartridge shell in detonating relationship with said main charge.

2. In a complete seismic charge assembly of claim 1, a slow burning composition, as a delay fuse intermediate said primer charge and said ignition charge, and said primer charge being detonatable in response to ignition of said delay fuse composition and spaced in detonating relationship therewith; and said delay fuse being ignitable in response to ignition of said ignition charge and spaced in ignition relationship therewith.

3. In a complete seismic charge assembly of claim 2, said cartridge shell being elongated, and said primer device extending into said cartridge shell through an end closure thereof and with said wall member of said primer device spaced from the interior and said cartridge shell at least sufficiently to be flush with the external surface of said cartridge shell end closure.

4. In a complete seismic charge assembly of claim 3, said primer device being closed at its ignition end by an empty primed rifle cartridge case.

5. In a complete seismic charge assembly of claim 4, said empty primed rifle case being rim-fired.

6. In a complete seismic charge assembly of claim 3, said nitrocarbonitrate charge comprising, on a weight basis, from 75 to 95 percent ammonium nitrate, and as a sensitizer component from 5 to 20 percent of at least one sensitizer selected from the group consisting of DNT oil, DNT solids and particulate aluminum containing at least 5 percent of its weight in flake form.

7. In a seismic charge assembly of claim 6, said nitrocarbonitrate charge also containing as a separate fuel component from 2 to 15 weight percent of at least one fuel selected from the group consisting of a fuel oil, ground coal and granular aluminum.

8. In a complete seismic charge assembly of claim 7, said nitrocarbonitrate charge being cylindrical and having a diameter of from 1¾ to 3 inches.

9. In a complete seismic charge assembly of claim 8, ammonium nitrate being in form of ground prills.

10. In a complete seismic charge assembly of claim 8, said nitrocarbonitrate charge containing from 75 to 90 percent ammonium nitrate together with from 1 to 15 percent sodium nitrate as the inorganic oxidizer salt component.

11. In a complete seismic charge assembly of claim 5, said empty primed rifle cartridge case being 0.22 caliber.

12. A complete seismic charge assembly of claim 8 wherein said primer charge of said primer device comprises a combination of (1) a diazodinitrophenol wafer, in direct open communication with said delay fuse, and of sufficiently high density to ignite in response to ignition of said delay fuse and (2) a mass of diazodinitrophenol intermediate said wafer and said base charge, and of sufficiently low density to detonate in response to ignition of said wafer.

13. In a complete seismic charge assembly of claim 1, at least one of said primer and cartridge shells being formed, at least in part, from a metal; a corrosion agent-forming material within at least one of said shells when formed from metal, as described, and said corrosion agent-forming material being chemically inert to the entire content of said shell(s) but, upon contact with water, forming an agent reactive with said shell(s) metal to cause at least partial disintegration of same for egress of shell(s) content through a resulting disintegrated shell(s) portion; said corrosive agent-forming material being present in said shell(s) in amount to form said agent in quantity for corrosion of said shell(s) metal and to cause said disintegration, and disposed within said shell(s) to permit direct contact of said corrosion-forming agent, when formed, with said shell(s) metal; and ingress means in said shell(s) containing said corrosion agent-forming material for admitting water into said shell(s) in contact with said corrosion agent-forming material at a rate, and in an amount, to form sufficient of said corrosion agent to cause said disintegration after a preset period of time for normal firing starting with initial emplacement in an underwater zone.

14. In a complete seismic charge assembly of claim 13, free elemental sulfur as said corrosion agent-forming material.

15. In a complete seismic charge assembly of claim 1, ingress means in at least one of said cartridge and primer shells for admitting water into said shell(s) in an amount to cause desensitization of at least one component therein after a preset time starting with initial emplacement of said assembly in an underwater zone.

16. In a complete seismic charge assembly of claim 15, as said ingress means, at least one open passageway in a wall of said shell(s) of size correlated with at least one live component therein to convey flow of water into said shell(s) for said desensitization.

17. In a complete assembly of claim 16, a water deteriorable member in closing relationship with at least one said passageway(s) and adapted to yield to flow of water into said shell(s) through said passageway to effect said desensitization after said predetermined time, whereby the size of said passageway(s) can be sufficiently large to admit the desensitizing amount of water promptly upon expiration of said predetermined time.

18. In a complete seismic charge assembly of claim 1, a tube member open at one end and closed at the other end extending, closed end first, into said cartridge shell and into said seismic charge therein as a well member for support of said primer device, and said primer device supported therein; and said well member formed from a water deteriorable material in watertight relationship with said cartridge shell during a preset period for normal firing of said charge assembly starting with initial emplacement of same in an underwater zone, but thereafter yielding to deteriorative action of said water to destroy said watertight relationship sufficiently to permit ingress of water into said cartridge shell.

19. In a complete charge assembly of claim 1, a tube member open at one end and closed at the other end extending, closed end first, into said cartridge shell and into said seismic charge therein as a well member for support of said primer device, and said primer device supported therein.

20. In a complete charge assembly of claim 2, a tube member open at one end and closed at the other end extending, closed end first, into said cartridge shell and into said seismic charge therein as a well member for support of said primer device, and said primer device supported therein.

21. In a complete charge assembly of claim 20, said cartridge shell being elongated, and a wall end closure therefor; said tube member extending through said wall end closure into said charge and supported at its open end in said wall end closure.

22. In a complete charge assembly of claim 21, said wall end closure positioned from an end of said cartridge shell to form a resulting open recessed shell end portion external to said charge.

23. A seismic exploration method, wherein a complete seismic charge assembly is emplaced in an underwater seismic exploration zone and fired to provide energy for a seismic record, comprising delivering said complete assembly into said zone, and said assembly comprising (1) a closed cartridge shell, and a seismic explosive charge therein, and (2) a primer device, with percussion initiator means therefor, including means for delay of priming action of said device after percussion initiation of same, and said device extending into detonating relationship with said seismic charge; in said zone, impacting said percussion initiatable primer device to percussion initiate same with subsequent delay of said priming action; and during the period of said delay, directing the thus initiated seismic charge assembly away from the point of said impacting for the subsequent detonation of same.

24. In a method of claim 23, delivering said complete charge assembly into said zone when said primer device contains, as said means for delay, a slow burning composition as a delay fuse, disposed intermediate said percussion initiating means and the remaining live primer components of said primer device.

25. In a method of claim 24, delivering said complete charge assembly into said zone when said delay fuse has a burning time of from 0.5 to 2 seconds.

26. In a seismic exploration method of claim 25, delivering said complete seismic charge assembly into said zone when said seismic explosive charge is a small nitrocarbonitrate charge, and when said percussion initiating means is spaced from the interior of said cartridge shell at least flush with the outside surface thereof.

27. A seismic exploration method wherein a complete seismic charge assembly is emplaced in an underwater zone and fired to provide energy for a seismic record, comprising towing a tube, extending into, and terminating in, said zone; said complete seismic charge assembly to be fired comprising (1) a closed cartridge shell containing a small seismic explosive charge and (2) a percussion initiated primer device for said seismic charge, and said primer device extending into said cartridge shell into detonating relationship with said seismic charge with the percussion initiating means for said device in direct and open communication with the outside of said shell; delivering said complete seismic charge assembly through said tube into said zone and therein directly impacting said percussion initiating means to thereby initiate said primer device with subsequent detonation of said seismic charge.

28. In a seismic exploration method of claim 27, delivering said complete seismic charge assembly through said tube when said seismic explosive charge is a small nitrocarbonitrate charge, and when said percussion initiating means is spaced from the interior of said cartridge shell at least flush with the outside surface thereof.

References Cited

UNITED STATES PATENTS

| | | | |
|---|---|---|---|
| 2,652,775 | 9/1953 | Swanson | 102—29 X |
| 3,326,126 | 6/1967 | Berthmann et al. | 102—24 |
| 3,358,600 | 12/1967 | Griffith et al. | 102—24 |
| 3,360,070 | 12/1967 | Cholet et al. | 102—24 X |

VERLIN R. PENDEGRASS, Primary Examiner

U.S. Cl. X.R.

181—.5